(12) United States Patent
Feldman

(10) Patent No.: US 9,036,284 B1
(45) Date of Patent: May 19, 2015

(54) ISOLATED SHINGLED BANDS OF FRACTIONAL TRACKS

(71) Applicant: Seagate Technology LLC, Cupertino, CA (US)

(72) Inventor: Timothy R. Feldman, Louisville, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/028,406

(22) Filed: Sep. 16, 2013

(51) Int. Cl.
*G11B 5/09* (2006.01)
*G11B 20/12* (2006.01)
*G11B 5/012* (2006.01)

(52) U.S. Cl.
CPC .... *G11B 20/1217* (2013.01); *G11B 2020/1228* (2013.01); *G11B 5/012* (2013.01); *G11B 2020/1277* (2013.01)

(58) Field of Classification Search
None
See application file for complete search history.

(56) References Cited

U.S. PATENT DOCUMENTS

| | | | |
|---|---|---|---|
| 5,784,220 A * | 7/1998 | Nishimura et al. | 360/78.14 |
| 5,903,411 A * | 5/1999 | Tomita et al. | 360/78.14 |
| 6,556,522 B1 | 4/2003 | Ko | |
| 6,728,899 B1 | 4/2004 | Ng | |
| 7,133,241 B2 * | 11/2006 | Che et al. | 360/75 |
| 7,679,851 B1 * | 3/2010 | Sun et al. | 360/48 |
| 7,813,236 B2 | 10/2010 | Gotoh | |
| 7,827,378 B2 * | 11/2010 | Feldman et al. | 711/202 |
| 8,120,868 B2 * | 2/2012 | Bi et al. | 360/48 |
| 8,179,627 B2 * | 5/2012 | Chang et al. | 360/48 |
| 8,270,256 B1 | 9/2012 | Juang | |
| 8,385,162 B2 | 2/2013 | Rosen | |
| 8,416,646 B2 | 4/2013 | Huang | |
| 8,432,633 B2 | 4/2013 | Grobis | |
| 8,537,481 B1 * | 9/2013 | Bandic et al. | 360/31 |
| 8,699,162 B1 * | 4/2014 | Grobis et al. | 360/48 |
| 8,699,185 B1 * | 4/2014 | Teh et al. | 360/135 |
| 8,908,310 B1 * | 12/2014 | Bai et al. | 360/48 |
| 2012/0212847 A1 * | 8/2012 | Sato et al. | 360/31 |
| 2013/0057981 A1 | 3/2013 | Urakami | |
| 2013/0318295 A1 * | 11/2013 | Kojima | 711/112 |

\* cited by examiner

*Primary Examiner* — Dismery Mercedes
(74) *Attorney, Agent, or Firm* — Cesari & Reed LLP; Kirk A. Cesari; Christian W. Best

(57) ABSTRACT

Systems and methods are disclosed for isolated bands of fractional tracks in data storage devices, particularly devices employing shingled magnetic recording. In one embodiment, a device may comprise a data storage medium including a first data storage area including tracks overlapped in a shingled manner and having a first circumferential portion of a track to store data, a second data storage area, and a guard area disposed between the first data storage area and the second data storage area, the guard area including a second circumferential portion of the track as a partial guard track. In some embodiments, the guard area may include at least one sector in the first circumferential portion of the track, such that at least one sector of the guard area is interposed between data storage sectors of the first data storage area.

20 Claims, 9 Drawing Sheets

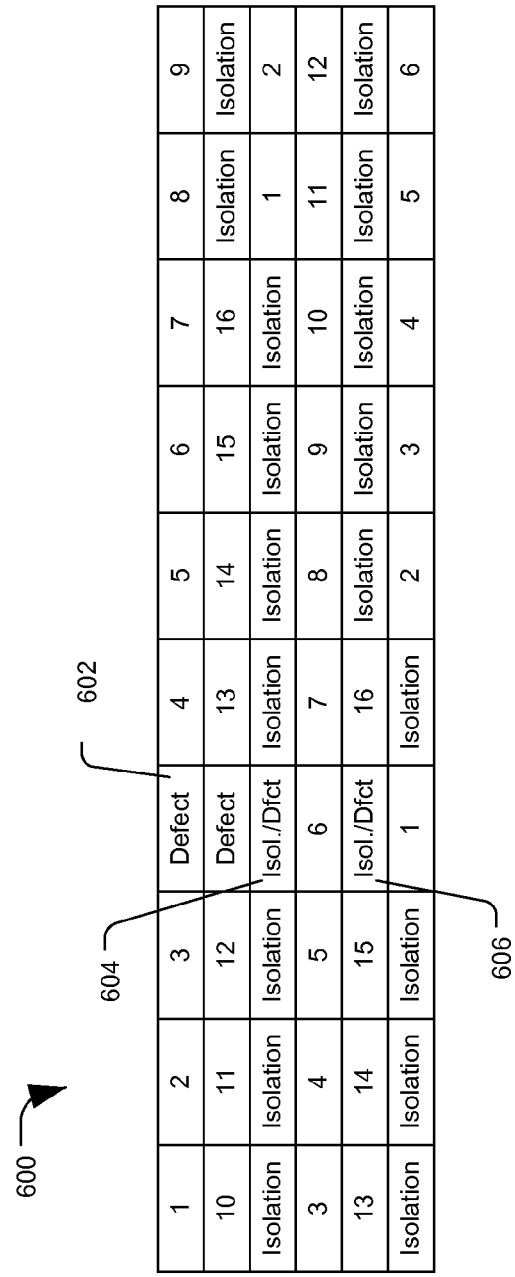

ISOLATED SHINGLED BANDS OF FRACTIONAL TRACKS

BACKGROUND

The present disclosure relates to data storage mediums, and provides systems and method for improving data storage device performance, especially when using shingled magnetic recording.

SUMMARY

In one embodiment, a device may comprise a data storage medium including a first data storage area of the data storage medium, a second data storage area of the data storage medium, and a guard area disposed between the first data storage area and the second data storage area. The first data storage area may have tracks overlapped in a shingled manner, the first data storage area including a first circumferential portion of a track to store data, and the guard area may include a second circumferential portion of the track as a partial guard track.

In another embodiment, a method may comprise formatting a data storage medium to include a plurality of bands, each band including a plurality of tracks configured to store data in a shingled manner, formatting a first band of the plurality of bands to include a first circumferential portion of a track to store data, formatting a second band of the plurality of bands, and formatting the data storage medium to include a guard area disposed between the first band and the second band, the guard area including a second circumferential portion of the track as a partial guard track.

In another embodiment, an apparatus may comprise a disc data storage medium including a plurality of bands, each band having a plurality of data tracks configured to store data in a shingled manner, each data track including a plurality of data sectors, a first band of the plurality of bands including a first circumferential portion of a track designated for data storage, the first circumferential portion including less than all data sectors of the track, and a second circumferential portion of the track designated as not writable.

BRIEF DESCRIPTION OF THE DRAWINGS

FIG. 5 is a diagram of another illustrative embodiment of a system for isolated shingled bands of fractional tracks;

FIG. 6 is a diagram of another illustrative embodiment of a system for isolated shingled bands of fractional tracks;

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure. It is also to be understood that features of the various embodiments can be combined, exchanged, or removed without departing from the scope of the present disclosure.

Figure 1:
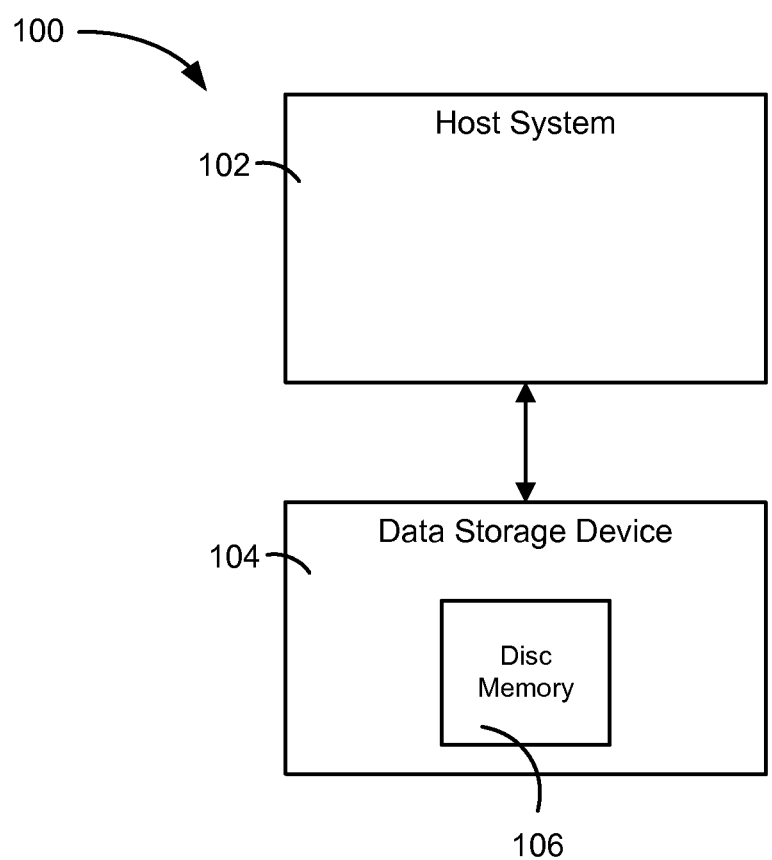
FIG. 1 is a diagram of an illustrative embodiment of a system for isolated shingled bands of fractional tracks.

FIG. 1 depicts an embodiment of a system for isolated shingled bands of fractional tracks, generally designated 100. The system 100 may include a host 102 and a data storage device (DSD) 104. The host 102 may also be referred to as the host system or host computer. The host 102 can be a desktop computer, a laptop computer, a server, a tablet computer, a telephone, a music player, another electronic device, or any combination thereof. Similarly, the DSD 104 may be any of the above-listed devices, or any other device which may be used to store or retrieve data. The host 102 and DSD 104 may be connected by way of a wired or wireless connection, or by a local area network (LAN) or wide area network (WAN). In some embodiments, the DSD 104 can be a stand-alone device not connected to a host 102, or the host 102 and DSD 104 may both be part of a single unit.

The DSD 104 can include one or more nonvolatile memories 106. In the depicted embodiment, the DSD 104 is a hard disc drive (HDD) including a rotating disc memory 106. In other embodiments, the DSD 104 may contain additional memories or memory types, including volatile and nonvolatile memories. For example, DSD 104 could be a hybrid HDD with both a disc memory and a nonvolatile solid state memory.

In some embodiments, DSD 104 may have one or more discs 106 having tracks for storing data. A disc 106 may be formatted with multiple zones, each with a plurality of tracks. Each track can be further divided into a plurality of physical sectors for storing data. Chunks of data with accompanying logical block addresses (LBAs) can be stored to the sectors, with the LBAs being mapped to the sector holding the respective chunk of data. Each zone may have different configurations of various options, such as data track format, data density, or intended uses. For example, the disc may have one or more zones formatted for data storage in a shingled track manner using shingled magnetic recording (SMR), and may also have one or more zones configured for storing data in a non-shingled manner. SMR is a recording method used to increase data recording density on a disc, for example by writing a track of data to partially overlap an adjacent data track. SMR will be discussed in more detail with regard to FIGS. 3-4. The disc may also have a zone designated as a 2nd level cache using disk storage intended for non-volatile caching of data in a non-shingled track manner. The disc may further have at least one zone designated for spare sectors. For example, if a sector on the disc is found to be defective, data intended for the defective sector can be stored to a spare sector.

Figure 2:
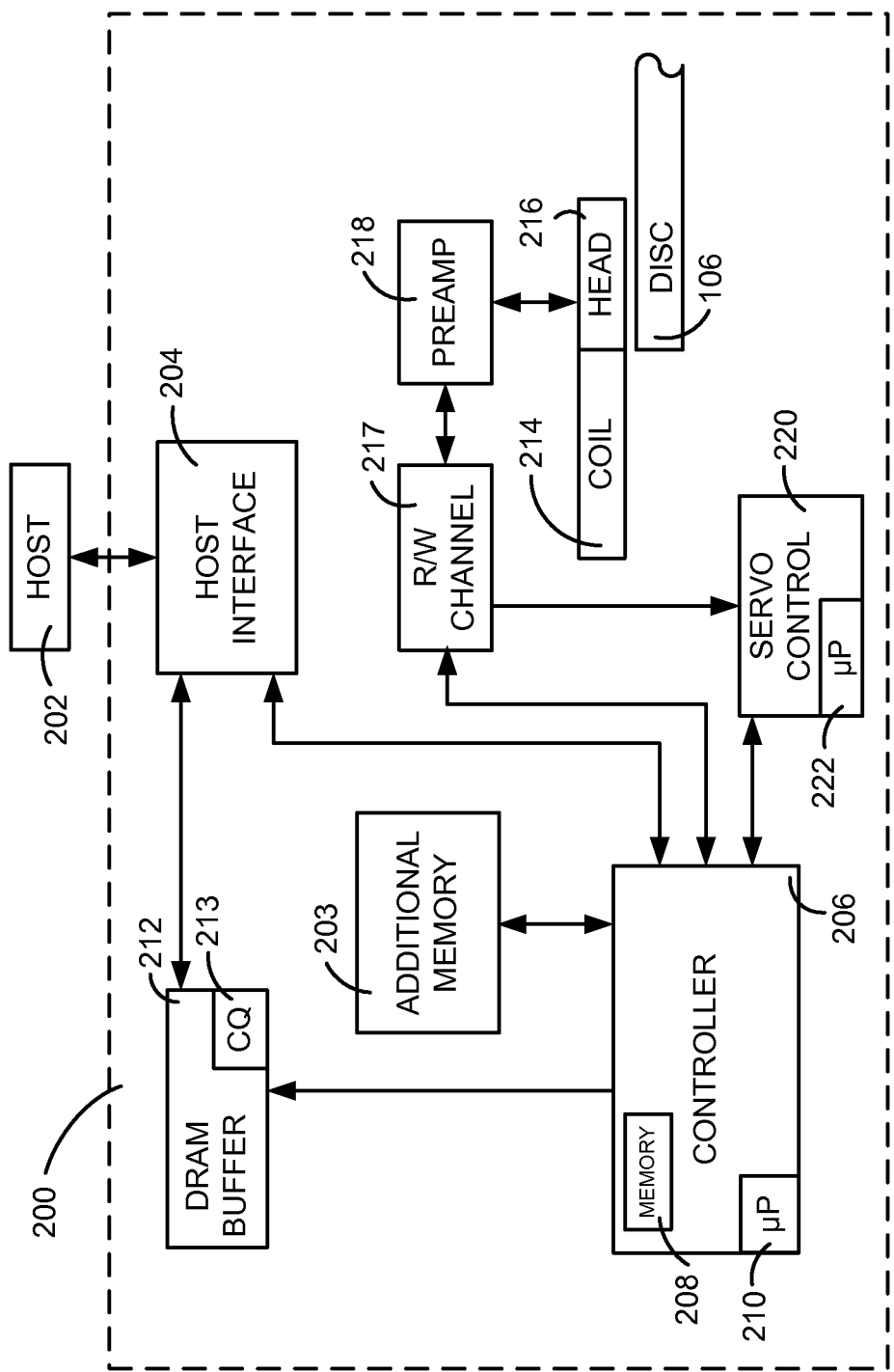
FIG. 2 is a diagram of another illustrative embodiment of a system for isolated shingled bands of fractional tracks.

FIG. 2 depicts a diagram of an embodiment of a system for isolated shingled bands of fractional tracks, generally designated 200. Specifically, FIG. 2 provides a functional block diagram of an example disc drive data storage device (DSD) 200. The DSD 200 may be a data storage device such as the disc drive 100 shown in FIG. 1. More generally, the DSD 200 can be a removable storage device, a desktop computer, a laptop computer, a server, a tablet computer, a telephone, a music player, another electronic device, any other device which may be used to store or retrieve data, or any combination thereof.

The data storage device 200 can communicate with a host device 202 via a hardware or firmware-based interface circuit 204 that may include a connector (not shown) that allows the DSD 200 to be physically removed from the host 202. The host 202 may also be referred to as the host system or host computer. The host 202 can be a desktop computer, a laptop computer, a server, a tablet computer, a telephone, a music player, another electronic device, or any combination thereof. In some embodiments, the DSD 200 may communicate with the host 202 through the interface 204 over wired or wireless communication, or by a local area network (LAN) or wide area network (WAN). In some embodiments, the DSD 200 can be a stand-alone device not connected to a host 202, or the host 202 and DSD 200 may both be part of a single unit.

The buffer 212 can temporarily store data during read and write operations, and can include a command queue (CQ) 213 where multiple pending operations can be temporarily stored pending execution. In some examples, the buffer 212 can be used to cache data. The DSD 200 can include an additional memory 203, which can be either volatile memory such as DRAM or SRAM, or non-volatile memory, such as NAND Flash memory. The additional memory 203 can function as a cache and store recently or frequently read or written data, or speculatively pre-fetched data. A DSD 200 containing multiple types of nonvolatile storage mediums, such as a disc 106 and Flash 203, may be referred to as a hybrid storage device. The disc 106 may be configured to store data in a shingled manner.

The DSD 200 can include a programmable controller 206 with associated memory 208 and processor 210. Further, FIG. 2 shows the DSD 200 can include a read-write (R/W) channel 217, which can encode data during write operations and reconstruct user data retrieved from disc(s) 106 during read operations. A preamplifier circuit (preamp) 218 can apply write currents to the head(s) 216 and provides pre-amplification of read-back signals. A servo control circuit 220, which can include a processor 222, may use servo data to provide the appropriate current to the coil 214 to position the head(s) 216. The controller 206 can communicate with the servo control circuit 220 to move the head(s) 216 to the desired locations on the disc(s) 106 during execution of various pending commands in the command queue 213.

As discussed above, SMR is a recording method used to increase data recording density on a disc, which can be accomplished by decreasing track width below a width written by a writer element of a transducer head. In other words, a disc may be formatted with tracks that have a narrower pitch than is written by a write head. This can be accomplished by partially overwriting a data track with an adjacent data track, resulting in a "shingled" track structure. For example, SMR write operations can be performed by sequencing writes so that they progress in one radial direction (i.e. tracks may be written one at a time moving from the inner diameter towards the outer diameter, or vice-versa), where tracks partially overlap each other similar to roofing shingles. Partially overwriting a track with another track may also be referred to as "trimming." A single write direction may be used across an entire disc, but can also be selected based on zones or sets of tracks, with a direction set for each zone or set of tracks.

Figure 3A:
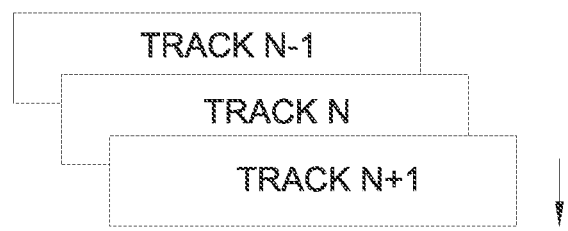
FIGS. 3a-3b are diagrams of another illustrative embodiment of a system for isolated shingled bands of fractional tracks.

Referring to FIG. 3a, if it is assumed that writing is performed in the arrow-indicated direction in the shingle-write scheme, when writing to track N, adjacent track N−1 may be partially overwritten. Similarly, when writing is performed on track N+1, adjacent track N may be partially overwritten. In contrast to recording methods where each track is written without any intentional overlap, SMR may result in increased recording density due to a higher tracks per inch (TPI) characteristic in a radial direction of a storage medium.

Figure 3B:
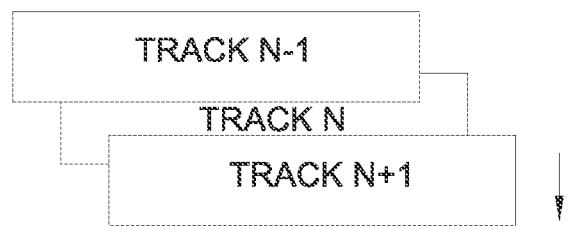

As illustrated in FIG. 3b, after writing on track N, if track N−1 is written in a reverse direction of the shingled recording direction, track N may become unreadable due to being partially or completely overwritten by both adjacent tracks. Therefore, it may be advantageous to follow a constraint that track N−1 should not be written after track N is written. Accordingly, writing or modifying data on track N−1 after track N is recorded, or on track N after track N+1 is recorded, may require a different writing strategy than with non-shingled tracks, which can simply be overwritten at any time.

Figure 4A:
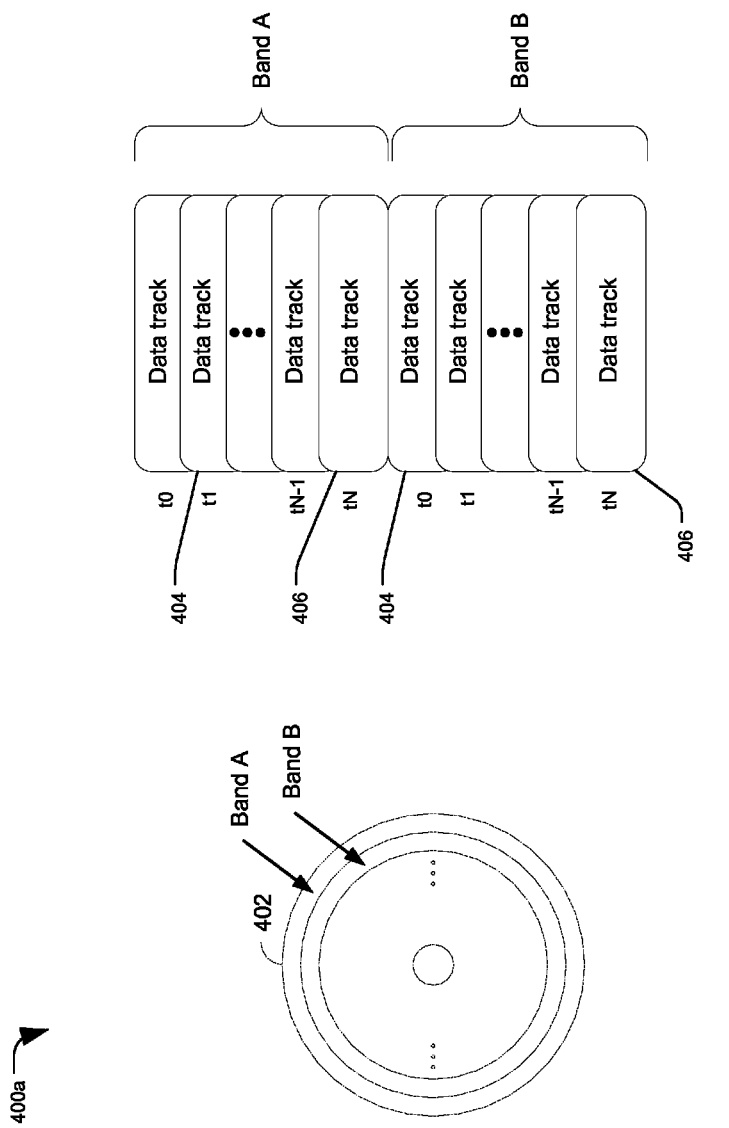
FIGS. 4a-4b are diagrams of other illustrative embodiments of a system for isolated shingled bands of fractional tracks.

Turning now to FIG. 4a, a diagram of another illustrative embodiment of a system 400a for isolated shingled bands of fractional tracks is depicted. Due to the track write overlap of SMR, writing a given track N−1 after track N has been written may require rewriting all shingled tracks that following track N−1 (i.e. track N, track N+1, track N+2, etc.) to restore the data stored in all of the tracks following the given track N−1. In order to accomplish this realistically, a set of tracks may be grouped into a "band," with the band ending with a guard track which isolates the band from the next group of tracks. Rotating disc media 402 may be divided into a plurality of bands (e.g. Band A, Band B, etc.), and each band may contain a plurality of shingled data tracks.

Separating bands so that rewriting one does not require rewriting tracks outside the band can be accomplished by locating the tracks such that the last track of a band is not trimmed or overlapped by a track that can be written. This in turn can be accomplished in a number of ways. One approach is to select tracks to be at the end of bands and make the radial pitch allocated to these tracks the full, unshingled track width. For example, a band may include tracks having two or more track widths. Bands may have a number of shingled tracks 404, such as tracks t0 through tN−1 of FIG. 4a, which are partially overlapped by adjacent tracks and have a reduced read track pitch relative to the write track pitch. Bands may also end with an unshingled track 406, such as track tN of FIG. 4a, which does not have a reduced read track pitch relative to its write track pitch. Because the last track 406 is not overlapped by a writable track, the band can be rewritten without affecting tracks outside the band. This approach may require determining track and band layouts early in the disc fabrication process, as the final track in a band may require a different track pitch than the other tracks in the band. In other words, it must be determined where bands will begin and end prior to defining the tracks on the disc.

Figure 4B:
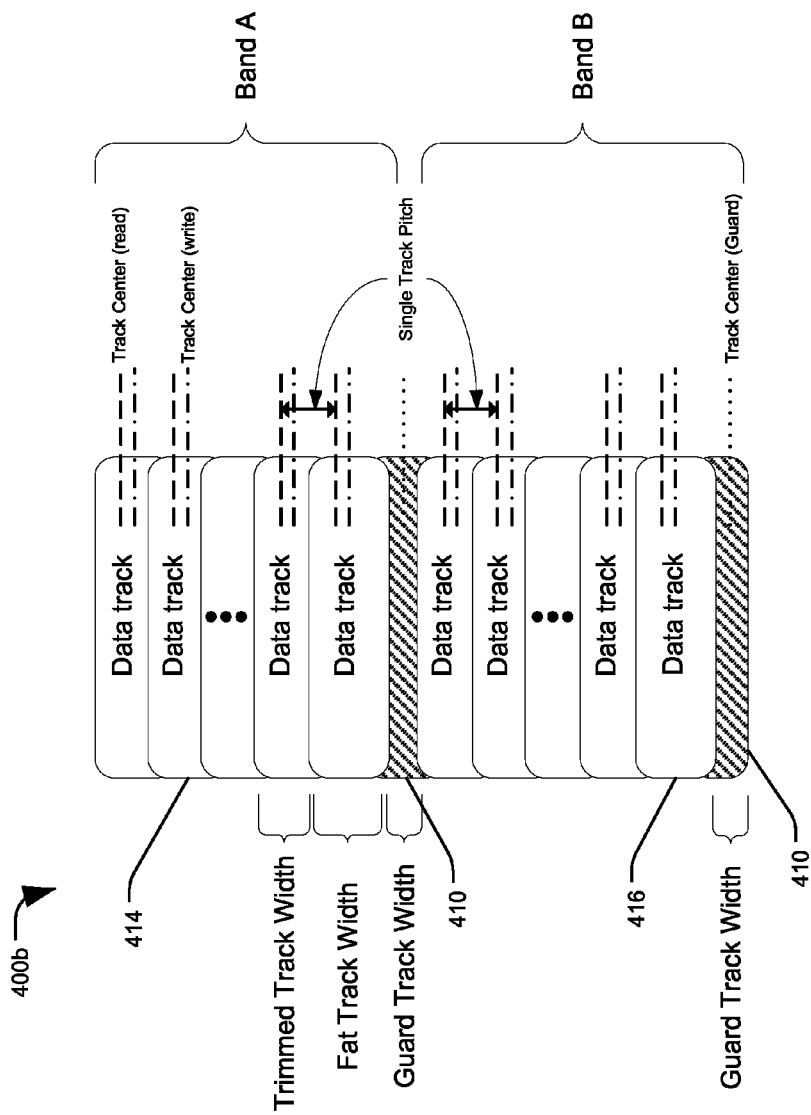

Alternatively, one or more tracks following each end-of-band track can be designated as not to be written. Turning now to FIG. 4b, a diagram of another illustrative embodiment of a system 400b for isolated shingled bands of fractional tracks is depicted. Not-to-be-written tracks may be referred to as "guard tracks" 410, as they provide band boundaries to separate writable tracks of different bands and guard the last track 416 of a band from being trimmed by or trimming tracks outside the band. When track N−1 needs to be re-written, tracks N−1 to the Guard Track can be rewritten, while tracks in other bands are not affected. In some embodiments, a single guard track may be used, while in some embodiments multiple tracks may be designated as "not to be written" between bands to provide a larger buffer against overlap or adjacent track interference (ATI). A guard track may also be referred to as a guard band or isolation track. In some embodiments, an isolation track may comprise rotational (i.e. circumferential) fractions of one or more tracks instead of one or more complete tracks. In an embodiment, separation of shingled bands may be accomplished by a number of isolation sectors to prevent sectors of one band interfering with another band, even if those isolation sectors do not comprise one or more whole tracks. For example, if each track has 100 sectors, an isolation track may include sectors 1-50 of Track A and sectors 51-100 of Track B, instead of being limited to using sectors 1-100 of Track B. This number of isolation sectors can collectively provide the same isolation as a single full guard track.

In some embodiments, the guard track between bands can be a non-shingled track (i.e. a track not trimmed by either adjacent track), but this may again require different track pitches and consequently require determining band boundaries prior to defining the tracks on the disc. In other embodiments, a guard track may be a shingled track which is not used to store data. In other words, all writable tracks and guard tracks may have the same width. In an example embodiment of a disc with multiple bands per zone, each zone may contain 110 tracks, and the 110 tracks may be divided into 10 bands containing 10 data tracks and 1 guard track each.

Guard tracks may be overlapped by both adjacent tracks without loss of data, as data may not be recorded to guard tracks. Accordingly, while all tracks may share the same width or write track center when defined on the disc, a band may include multiple track widths or read track centers in practice. As shown in FIG. 4b, trimmed tracks 414 may have one width due to being partially overlapped in one direction; the last data tracks in each band 416, or "fat tracks," may have a second track width due to not being overlapped in either direction; and the guard tracks 410 may have a third track width due to being overlapped in both directions. The read center may be designated as the same for both shingled tracks 414 and "fat tracks" 416 for simplicity, or in some embodiments the read center for fat tracks 416 can be designated as the same as the write center.

In some embodiments it may be desirable to have bands of a varying number of tracks on the disc. For example, it may be desirable to be able to remap data from one band to another, such as by moving data from a first physical band to a second physical band, and changing the logical band identifiers for those bands (e.g. a set of data may be stored to "logical band 1," currently mapped to the first physical band, and then moved to the second physical band which then becomes logical band 1). Moving data in such a manner may require that each band have the same minimum usable data storage capacity. Tracks at the outer diameter (OD) of a disc may have a different number of usable data sectors for storing data than tracks at the inner diameter (ID). So if bands are intended to have approximately the same storage capacity, bands near the OD may desirably include a different amount of tracks or fractions of tracks than bands near the ID. While bands can be set to have the same number of tracks, this may result in inefficiency and unused sectors in some bands.

As stated, advanced data management schemes for shingled magnetic recording may use a minimum amount or fixed, constant amount of user capacity in each band. Bands of an integral number of tracks (i.e. using whole tracks only) may have a variable amount of capacity or a variable amount of additional capacity beyond a minimum capacity constraint. For example, assume a system with a minimum requirement of 40 sectors of usable data space per band. If a set of tracks have 12 sectors each, then a band with an integral number of tracks would need to use 4 tracks which have a total of 48 sectors, and the band would thus contain 8 unnecessary sectors. Lacking any other influence, the extra space in bands may be in the range of zero to one track, for an average of one half track of excess capacity above a set minimum. While some schemes attempt to take advantage of this additional capacity, it may generally be wasted or of little or no value. This can result in a large format inefficiency.

To address this inefficiency, bands can be designed to take advantage of fractional tracks instead of an integral number of tracks. For example, bands may start and end at radially varying locations such that the first and last tracks are not necessarily full tracks. Instead, the boundaries may be selected for optimally meeting constraints such as usable user capacity and band isolation. Given the geometry of a preceding band (e.g. where the band begins and ends, which may be based on the physical location of sectors on a disc), a next band may be configured to start with sufficient isolation from the preceding band, and extend to meet exactly a usable user capacity target or other desired constraint.

In regards to sufficiently isolating a band from the preceding band, if a preceding band ends using a full-length track, then one or more full guard tracks may be provisioned to provide isolation. If the preceding band ends using part of a track, then the same amount of isolation may be provisioned, but not as full tracks; rather, the remainder of the last track used by the preceding band may be the start of the isolation provisioning, and the isolation may proceed through subsequent tracks until at each rotational position the required isolation is provisioned. This may typically mean that the last isolation track is the rotational complement of the first so that the total amount of isolation space is the same as an integral number of tracks. Note, however, that any amount of isolation may be supplied including a fractional total number of data tracks.

The band length may be decided based on a desired constraint, such as a desired number of usable data sectors. This length may not need to correspond to an integral number of tracks, and may begin or end with fractional segments of a track. A desired number of isolation sectors may then be provisioned between each band.

Some of these concepts are depicted in FIG. 5. FIG. 5 depicts a diagram of an illustrative embodiment of a system for isolated shingled bands of fractional tracks. FIG. 5 shows two example bands with 16 sectors each, tracks of 10 sectors each, and isolation of one track pitch. The first band, which might be the first band of the drive, starts at a track boundary and thus may use all of the first track but only part of the second track. The last 4 sectors of the second track and the first 6 sectors of the third track may be provisioned as isolation. This may isolate the first band from the second band with a full track pitch of media at all rotational positions. The second band may then use the last 4 sectors of the third track, all 10 sectors of the fourth track, and the first two sectors of the fifth track. By using fractional tracks, bands can be designed with specific capacities without wasting sectors in excess of those capacities in whole tracks.

Turning now to FIG. 6, a diagram of another illustrative embodiment of a system for isolated shingled bands of fractional tracks is shown and generally designated 600. A shingled recording scheme employing fractional tracks can make optimal band boundaries even in the presence of defects as shown in example 600. In this example, there may be defects 602 in the fourth sector of the first three tracks, such as from a short scratch. The first band may be configured with two more sectors to compensate for the two defects included within the span of the band. Note that a defect 604 where isolation is needed may still fill the role of isolation, as isolation sectors do not need to store data. Similarly, a defect 606 within the span of a band on the last track of the band can provide isolation and allow the neighboring sector to be used.

The sectors used for isolation can be tracked in tables. With non-fractional isolation tracks, an isolation track may simply be identified in a table by the track number. In some examples, fractional isolation tracks may be listed using a single starting track, and at least one rotational position. If multiple tracks of isolation are used, a number of tracks in the guard track may also be identified, or a total number of isolation sectors. The increase in information to track isolation sectors, for example from 1 to 3 pieces of information, may not significantly impact device performance.

The amount of capacity in each band can include some margin, say for defects discovered in the future. For instance, the capacity required in each band might be 14 sectors, but by allocating 16 sectors per band a band can accommodate 2 defects before being retired or requiring spare sectors. These spare sectors may be in excess of a minimum required capacity. However, using fractional tracks allows bands to be configured with a desired number of spare sectors instead of being constrained by a number of sectors per track, as when using full-track bands and isolation tracks.

Figure 7:
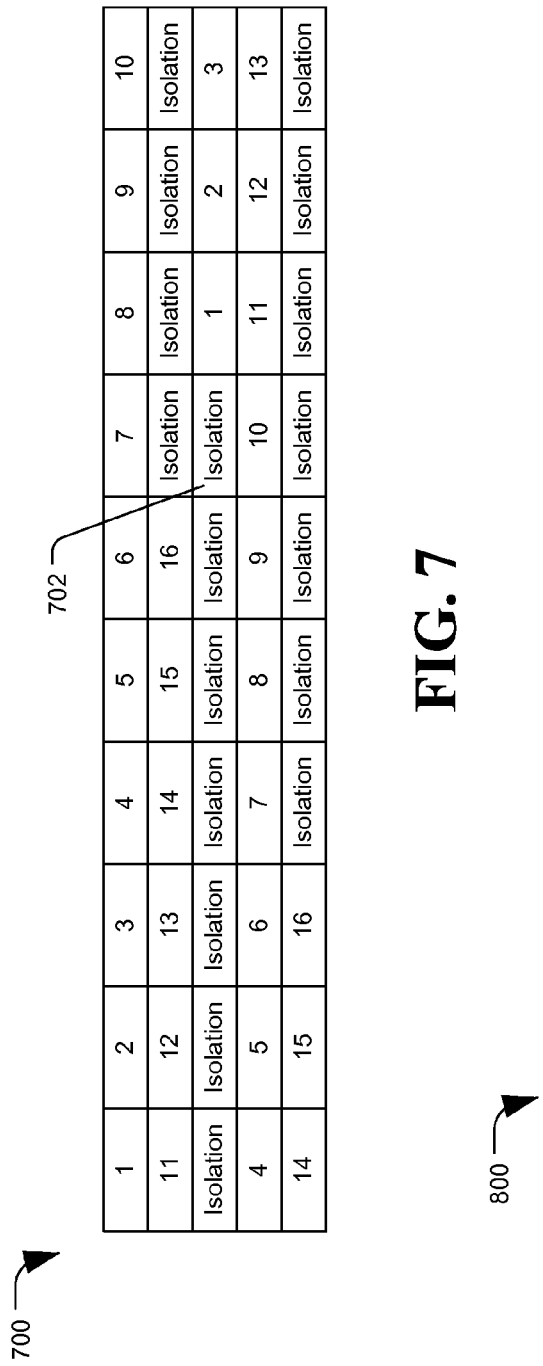
FIG. 7 is a diagram of another illustrative embodiment of a system for isolated shingled bands of fractional tracks.

FIG. 7 shows a diagram of an example embodiment of a system for isolated shingled bands of fractional tracks generally designated 700. Some drives may use some rotational margin to ensure complete isolation of bands. If there is rotational uncertainty in the start and end position of a sector, such as with spin speed variation or other variation that is not sufficiently accommodated by the sector format, some amount of additional isolation may be included. This may be needed, for instance, when the end of a band is between servo bursts but not when the end lines up with a servo burst. For example a non-isolation sector at the end of one band may end up rotationally positioned such that it overlaps another non-isolation sector in another band if the rotational freedom is too large. This may be addressed by including one or more additional isolation sectors to compensate for rotational uncertainty.

Example 700 shows a single additional isolation sector 702 in addition to the full track of isolation sectors that appear otherwise sufficient to isolate the two adjacent bands. This additional isolation sector 702 can be used to compensate for rotation uncertainty when seeking to a new band.

Figure 8:
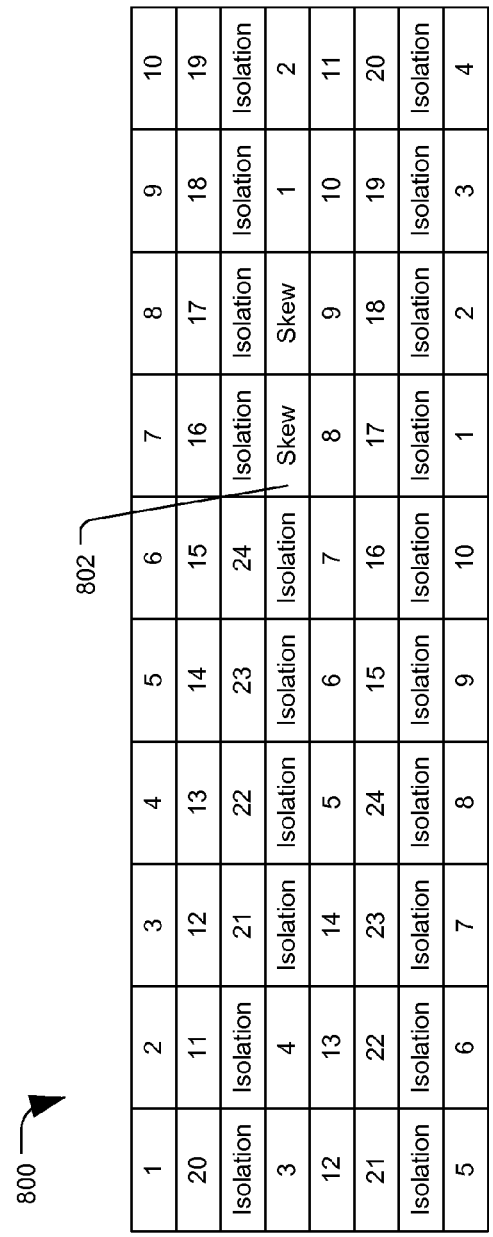
FIG. 8 is a diagram of another illustrative embodiment of a system for isolated shingled bands of fractional tracks.

The diagram of FIG. 8 depicts another example embodiment of a system for isolated shingled bands of fractional tracks generally designated 800. Some drives may add more unused sectors to produce a track-to-track skew so that sequential media operations that span band boundaries complete faster. For example, as a transducer head moves between tracks on a disc, the rotation of the disc means that one or more sectors may pass before a head can fully transition between the tracks. To compensate for this transition period, sectors may be skewed on a disc by one or more sectors so that the head can continue reading sequential data as soon as it reaches the new track, instead of waiting for the disc to make a full revolution to continue reading. Note that the previous diagrams did not reflect the skew which may be normally present within a band.

The band size in this example has been increased to 24 sectors. Example 800 shows a 1-sector intra-band skew and a 2-sector inter-band skew. As an example of intra-band skew after a head reads sectors 1 to 10 on the first track, it may need to change to the second tract to continue reading at sector 11. To accommodate the transition from track 1 to track 2, sector 11 may be located in the second sector position. The head may read sectors 11 to 19, and then 20 in the first sector slot once the disc has fully rotated. The head may then need to transition to track 3, where sector 21 is also skewed by one sector to sector 3.

The inter-band skew may be slightly larger than the intra-band skew because the seek time may be longer to change 2 tracks instead of 1 track in this example. Rather than a single sector skew as in the intra-band example, the inter-band skew may be two sectors 802. In this example, a head may only need to change one track between sector 24 of the first band to sector 1 of the second band, and therefore two skew sectors may not be necessary. On the other hand, the head may need to change two tracks to move from sector 24 of the second band to sector 1 of the third band, and therefore a skew of two sectors may be necessary. In some embodiments, the amount of skew may be determined on a band-by-band basis, based on an actual amount of seeking necessary. In other embodiments, the same amount of skew sectors may always be used between bands for simplicity, or to allow some flexibility of band placement. In some embodiments, with large rotation freedom additional isolation sectors as shown in FIG. 7 may be used in addition to skew sectors. In other embodiments, inter-band skew sectors may have the same value as the additional isolation sectors in the previous example, so that it may not be necessary to include both additional skew sectors and additional isolation sectors in some instances.

As stated, in FIG. 8 the eleventh sector of the first band may be rotationally moved by one position to produce the intra-band skew. The first sector of the second band may be placed rotationally two sectors further to produce the inter-band skew. Additionally, since the second band ends using a full track, no additional skew sectors may be needed before the start of the third band. This may be a preferred situation that can be made common by selection of band sizes for particular track sizes. For example, a band size could be selected that will frequently end with a full track, based on the number of sectors of the various tracks (e.g. find common multiples between the number of sectors in the single band size and the number of sectors of the various tracks). In some embodiments, a disc could have bands of different sizes or capacities based on which tracks the bands include, so that the bands end with a full track.

Figure 9:
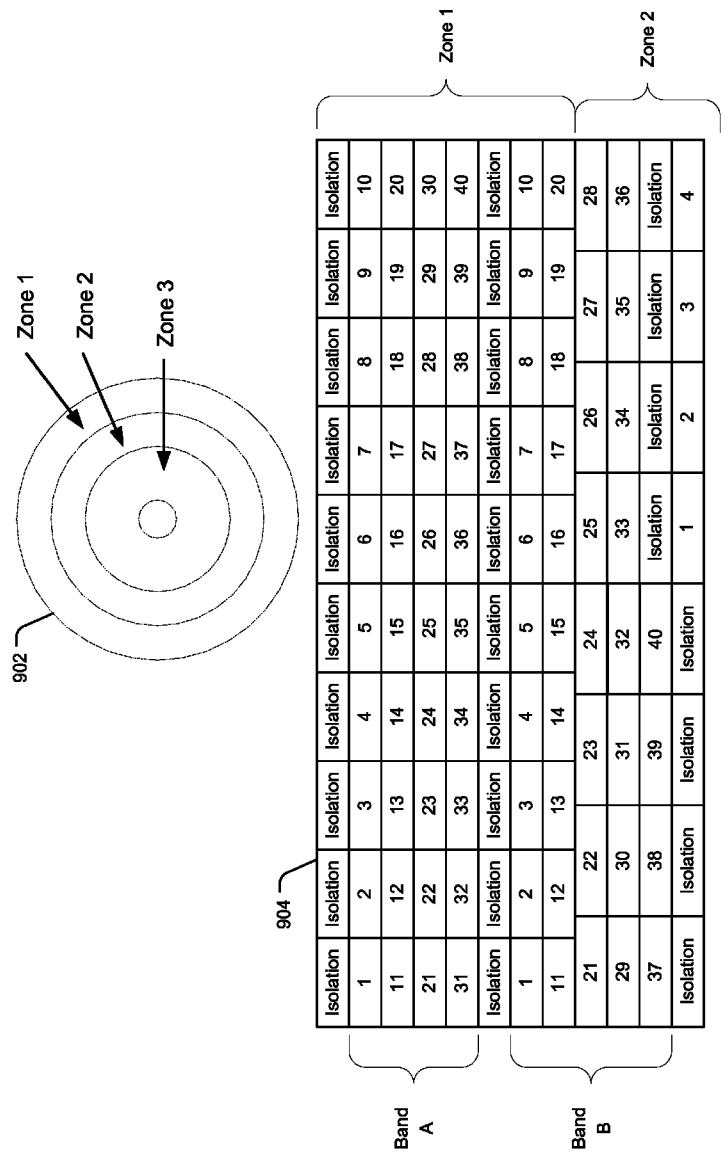
FIG. 9 is a diagram of another illustrative embodiment of a system for isolated shingled bands of fractional tracks.

FIG. 9 depicts a diagram of another illustrative embodiment of a system for isolated shingled bands of fractional tracks generally designated 900. Memory 902 may be a disc configured to employ shingled magnetic recording, and further may be configured with a plurality of data zones, such as depicted Zones 1, 2, and 3. Each zone may have a plurality of tracks, and may also include one or more shingled bands. Different data zones may have a different number of sectors per track. As the radius changes, the circumference changes (i.e. the circumference at the outer diameter is greater than the circumference at the inner diameter), and since linear density is a first-order limitation to the number of sectors per track, radii can be selected at which to change from one number of sectors per track to another. The data zone boundaries may not necessarily coincide with desired SMR band boundaries.

Diagram 904 depicts an example embodiment of bands which span data zone boundaries. In the depicted example, each band may have a minimum of 40 usable data sectors, but the number of data sectors per track may differ between zones. Zone 1, near the outer diameter of the disc 902, may have 10 sectors per track, while zone 2 may have 8 sectors per track. Tracks from different zones depicted in the diagram 904 may be shown as the same size to represent a full revolution of the disc, but in practice the tracks closer to the ID may have less total area, and consequently each track may contain fewer data sectors. As shown in diagram 904, band A may be located wholly within zone 1, while band B may be partially within zone 1 and partially within zone 2. Accordingly, band B may include tracks with a different number of sectors per track, and may further end with a partial track. Employing fractional tracks for SMR bands allows for more easily positioning bands across zone boundaries, where matching a desired number of data sectors per band across tracks with different numbers of sectors may otherwise be difficult.

Figure 10:
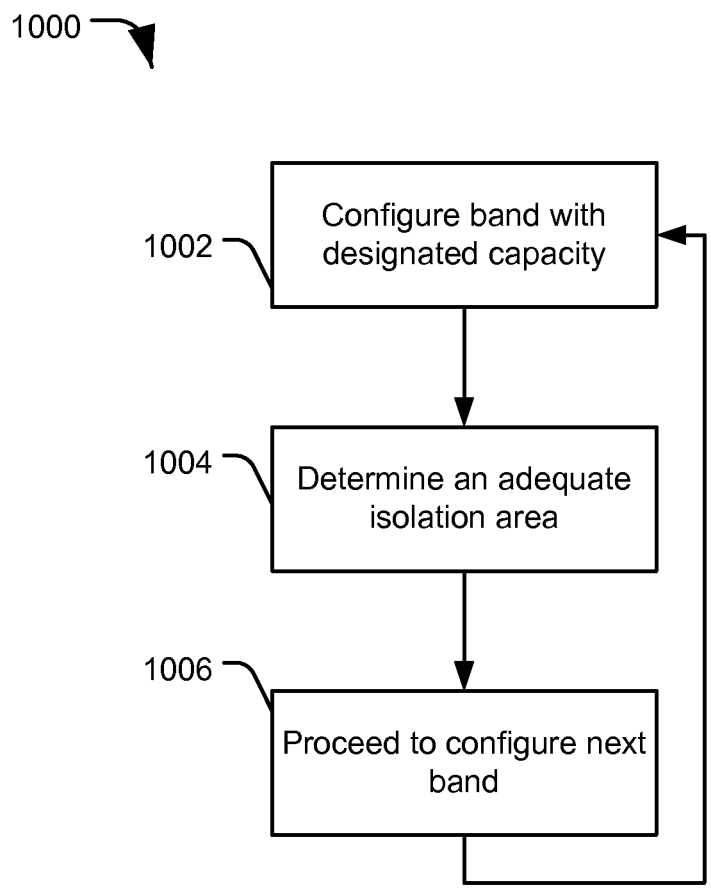
FIG. 10 is a flowchart of an illustrative embodiment of a method for isolated shingled bands of fractional tracks.

FIG. 10 depicts a flowchart of an illustrative embodiment of a method for isolated shingled bands of fractional tracks, generally designated 1000. At 1002, the method may comprise configuring a band with a designated capacity. For example, this may be the first band at the outer diameter or inner diameter of a disc. A designated capacity may be a minimum amount of user data storage capacity, and may also include one or more spare sectors, such as to compensate for defective sectors. In an example embodiment, each band may have a minimum of 24 usable sectors, and the band may be configured to have 24 sectors even if this results in the band only using a fraction of the last track in the band, rather than an entire track.

In some embodiments, a data storage medium may be scanned for defective sectors before configuring the band, so that any defective sectors are taken into account when configuring the band's size, in which case any spare sectors may be used for later-developing defects. In other embodiments the disc may not be scanned for defective sectors prior to band configuration, and spare sectors may be used to compensate for defective sectors once detected.

The method 1000 may also involve determining an adequate isolation area, at 904. An adequate isolation area may be an amount of space sufficient to prevent data recorded to one band from interfering with tracks of an adjacent band. The isolation area may comprise one or more sectors to create a buffer between the sectors of adjacent bands. In some embodiments, the isolation buffer may comprise one or more whole or fractional tracks.

For example, the isolation area may begin immediately after the last writable sector of the previous band, even if that sector is in the middle of a track. An adequate isolation area may include one or more tracks such that no sector of one band is directly adjacent to a sector of the next band. Further, an adequate isolation area may also include some additional isolation sectors to compensate for rotational uncertainty, or one or more sectors to compensate for skew as a transducer head travels between tracks of different bands. Isolation or skew sectors may include defective sectors. In some embodiments, the isolation area may be configured to include defective sectors in the last track of a band or in the first track of the next band.

Once an adequate isolation area has been determined, the method 1000 may proceed to determining the next band, at 1006. The next band may begin at any point on a track, such as immediately following the end of any isolation or skew sectors. Configuring the band may involve repeating steps 1002 and 1004 of method 1000.

Configuring bands and isolation areas may be performed by a data storage device (DSD), such as by a controller in a disc drive. Configuring the bands and isolation areas may include creating and maintaining a mapping table identifying where each band begins and ends, and may also including maintaining a list of defective sectors, isolation areas, spare sectors, or other information relating to the configuration of bands on a disc or other storage medium.

While many of the examples and embodiments disclosed herein are directed toward shingled magnetic recording, concepts and examples may also be applied to other storage mediums.

In accordance with another embodiment, the methods described herein may be implemented as one or more software programs running on a computer processor, controller device, or other computing device, such as a personal computer that is using a data storage device such as a disc drive. Dedicated hardware implementations including, but not limited to, application specific integrated circuits, programmable logic arrays, and other hardware devices can likewise be constructed to implement the methods described herein. Further, the methods described herein may be implemented as a computer readable storage medium or device storing instructions that when executed cause a processor to perform the methods.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A device comprising:
   a data storage medium including:
      a first data storage area of the data storage medium having tracks overlapped in a shingled manner, the first data storage area including a first circumferential portion of a track to store data;
      a second data storage area of the data storage medium; and
      a guard area disposed between the first data storage area and the second data storage area, the guard area including a second circumferential portion of the track as a partial guard track.

2. The device of claim 1 further comprising:
   the first data storage area configured to have a selected data storage capacity.

3. The device of claim 2 further comprising:
   the second data storage area also has the selected data storage capacity.

4. The device of claim 3 further comprising:
   the selected data storage capacity is a number of data sectors.

5. The device of claim 4 further comprising:
   the selected data storage capacity further includes a specified number of spare sectors.

6. The device of claim 1 further comprising:

the guard area configured to isolate the first data storage area from the second data storage area so that no portion of the first data storage area is directly adjacent to the second data storage area.

7. The device of claim 6 further comprising:
the guard area including a first quantity of data sectors designated as not-to-be-written sufficient to prevent any data sector of the first data storage area from being adjacent to a data sector of the second data storage area.

8. The device of claim 7 further comprising:
the guard area including at least one sector in the first circumferential portion of the track, such that at least one sector of the guard area is interposed between data storage sectors of the first data storage area.

9. The device of claim 8 further comprising:
the at least one sector is a defective sector.

10. The device of claim 7 further comprising:
a first track having circumferentially-adjacent first sector, second sector, and third sector;
a second track having circumferentially-adjacent fourth sector, fifth sector, and sixth sector;
the fourth sector being radially-adjacent to the first sector, the fifth sector being radially-adjacent to the second sector, and the sixth sector being radially-adjacent to the third sector;
the first track having the first sector and the third sector configured as usable data sectors, and the first track having the second sector configured as an isolation sector;
the first data storage area including the first sector and the third sector;
the second track having the fourth sector and the sixth sector configured as isolation sectors, and the second track having the fifth sector configured as a usable data sector;
the second data storage area including the fifth sector.

11. The device of claim 7 further comprising:
the data storage medium includes a disc data storage device; and
the guard area includes a quantity of skew sectors in addition to the first quantity of data sectors, the skew sectors arranged such that a first data sector of the second data storage area is rotationally offset from a last sector of the first data storage area to compensate for an amount of rotation of the disc data storage device as a transducer moves from the first data storage area to the second data storage area.

12. The device of claim 1 further comprising:
the data storage medium includes a plurality of zones,
each zone including a plurality of tracks and one or more data storage areas,
a first zone of the plurality of zones having a first number of data sectors per track,
a second zone of the plurality of zones having a second number of data sectors per track; and
the first data storage area having a first number of tracks in the first zone and a second number of tracks in the second zone.

13. A method comprising:
formatting a data storage medium to include a plurality of bands, each band including a plurality of tracks configured to store data in a shingled manner;
formatting a first band of the plurality of bands to include a first circumferential portion of a track to store data;
formatting a second band of the plurality of bands; and
formatting the data storage medium to include a guard area disposed between the first band and the second band, the guard area including a second circumferential portion of the track as a partial guard track.

14. The method of claim 13 further comprising:
formatting the first band to include a selected number of data sectors to store user data.

15. The method of claim 14 further comprising:
formatting the first band to include a specified number of spare sectors in addition to the selected number of data sectors to store user data.

16. The method of claim 14 further comprising:
formatting the data storage medium to include a plurality of bands including the first band; and
formatting the plurality of bands with the specified amount of data sectors based on a common multiple with a number of sectors in tracks of the data storage medium, so that a number of the plurality of bands include a full track for the last track.

17. The method of claim 14 further comprising:
determining a first number of data sectors designated as not-to-be-written sufficient to prevent any data sector of the first band from being adjacent to a data sector of the second band; and
formatting the guard area including the first number of data sectors.

18. The method of claim 17 further comprising:
detecting defective sectors on the data storage medium prior to formatting the data storage medium to include the plurality of bands; and
formatting the guard area to include at least one defective sector in the first circumferential portion of the track, such that at least one sector of the guard area is interposed between data storage sectors of the first band.

19. An apparatus comprising:
a disc data storage medium including:
a plurality of bands, each band having a plurality of data tracks configured to store data in a shingled manner, each data track including a plurality of data sectors;
a first band of the plurality of bands including a first circumferential portion of a selected track designated for data storage, the first circumferential portion including less than all data sectors of the track; and
a guard area including a number of sectors designated as not writable to isolate all user data writable sectors of the first band from all user data writable sectors of a second band, the guard area including a second circumferential portion of the selected track designated as not writable.

20. The apparatus of claim 19 further comprising:
the guard area includes at least one defective sector in the first circumferential portion of the selected track, such that at least one sector of the guard area is interposed between data storage sectors of the first circumferential portion.

* * * * *